United States Patent [19]
Matsuoka et al.

[11] Patent Number: 5,569,991
[45] Date of Patent: Oct. 29, 1996

[54] ELECTRIC POWER STEERING APPARATUS

[75] Inventors: Hirofumi Matsuoka, Kyoto; Mitsuhiko Nishimoto, Kashihara, both of Japan

[73] Assignee: Koyo Seiko Co., Ltd., Osaka, Japan

[21] Appl. No.: 362,837

[22] Filed: Dec. 23, 1994

[30] Foreign Application Priority Data

Dec. 24, 1993 [JP] Japan ................................. 5-327934

[51] Int. Cl.⁶ ..................................................... B62D 5/04
[52] U.S. Cl. ............................................. 318/286; 180/446
[58] Field of Search ................................. 180/79.1, 142; 318/432, 280–286; 364/424.05

[56] References Cited

U.S. PATENT DOCUMENTS

| | | | |
|---|---|---|---|
| 4,719,396 | 1/1988 | Shimizu | 318/432 |
| 4,802,544 | 2/1989 | Maeda | 180/79.1 |
| 4,834,201 | 5/1989 | Miyazaki et al. | 180/79.1 |
| 5,027,276 | 6/1991 | Morishita et al. | 180/79.1 |
| 5,097,420 | 3/1992 | Morishita | 180/79.1 |
| 5,303,156 | 4/1994 | Matsuoka et al. | 318/434 X |
| 5,404,960 | 4/1995 | Wada et al. | 180/79.1 |
| 5,444,622 | 8/1995 | Takeshima et al. | 180/79.1 |

FOREIGN PATENT DOCUMENTS

| | | |
|---|---|---|
| 4402423A1 | 7/1994 | Germany . |
| 2290779 | 11/1990 | Japan . |
| 2188890 | 10/1987 | United Kingdom . |

*Primary Examiner*—David S. Martin
*Attorney, Agent, or Firm*—Darby & Darby, P.C.

[57] ABSTRACT

The invention provides an electric power steering apparatus, in which one of a pair of switching elements that has been PWM controlled is turned off and the other switching element is PWM controlled instead when a steering wheel is returning to its neutral position, thereby allowing the steering wheel to return smoothly and preventing a control hunting.

2 Claims, 11 Drawing Sheets

ELECTRIC POWER STEERING APPARATUS

BACKGROUND OF THE INVENTION

1. Field of the Invention

The present invention relates to an electric power steering apparatus, and more particularly it relates to improvement in motor driving while a steering wheel is returning to its initial position.

2. Description of Related Art

In an electric power steering apparatus widely used these days, a motor is driven by a current value corresponding to detected steering torque, and the thus obtained driving force of the motor is transferred to a steering mechanism so as to assist the steering power.

FIG. 1 is a circuit diagram showing the configuration of a motor control circuit in a conventional electric power steering apparatus. FETs $Q_1$, $Q_2$, $Q_3$ and $Q_4$ form a bridge circuit between a power supply E and a ground terminal. A motor M and a resistance R for detecting a motor driving current are connected in series so as to bridge the contact between the FETs $Q_1$ and $Q_3$ connected in series and the contact between the FETs $Q_2$ and $Q_4$ also connected in series. The voltages at both ends of the resistance R for detecting a motor driving current are respectively inputted to the non-inverted input terminal and the inverted input terminal of a differential amplifier 4, which outputs a differential output generated in accordance with the inputted voltages as a signal $I_d$ being equivalent to the motor driving current. Further, the FETs $Q_1$, $Q_2$, $Q_3$ and $Q_4$ contain free wheeling diodes $D_1$, $D_2$, $D_3$ and $D_4$ connected thereto in parallel, respectively.

A value of steering torque supplied to a steering wheel (not shown) and detected by a torque sensor 5 is inputted to a signal processor 3, which outputs, in accordance with the detected torque, a signal 11 being equivalent to a target motor current (i.e., a target value of a motor current) to the non-inverted input terminal of a differential amplifier 1. To the inverted input terminal of the differential amplifier 1 is inputted the signal $I_d$ being equivalent to the aforementioned motor driving current. The differential amplifier 1 outputs to an FET driving circuit 2 a difference between these inputted values as a signal $V_1$ being equivalent to a target motor voltage required for supplying the target motor current to the motor M. In the FET driving circuit 2, a motor driving voltage $V_N$ is generated from the signal $V_1$ being equivalent to the target motor voltage. By using a duty ratio in accordance with the magnitude of the absolute value of the motor driving voltage $V_N$, and also in accordance with the polarity of the motor driving voltage $V_N$, the FET driving circuit 2 turns on the FET $Q_3$ and simultaneously performs a pulse width modulation control (hereinafter referred to as PWM control) on the FET $Q_2$, or turns on the FET $Q_4$ and simultaneously performs the PWM control on the FET $Q_1$, thereby driving the motor M in the clockwise or counter-clockwise direction.

While a steering wheel (not shown) is returning to its neutral position, however, the driving direction of the motor M (i.e., the direction in which the motor is to be rotated) in accordance with the steering torque detected by the torque sensor 5 is different from the actual rotation direction of the motor M. Accordingly, a generated current caused by the rotation of the motor M flows through the circuit, resulting in causing a control hunting. As a result, not only an abnormally loud noise is made in the motor M but also a braking force in the reverse direction of the rotation direction of the steering wheel is generated, thereby preventing the steering wheel from returning to its neutral position smoothly.

Such a phenomenon will now be described in more detail. In returning the steering wheel to its neutral position, if the motor M is rotated in, for example, the counterclockwise direction while driving in the clockwise direction, the FET $Q_2$ is PWM controlled and the FET $Q_3$ is turned on. FIG. 2 is a circuit diagram illustrating the operation of the bridge circuit in a general motor control circuit. As is shown in FIG. 2, when the PWM controlled FET $Q_2$ is on, a PWM controlled current flows through the FETs $Q_2$ and $Q_3$ as shown with a solid line arrow 6. When the PWM controlled FET $Q_2$ is turned off, a generated current caused by the rotation of the motor M and a regenerated current caused by the inductance of the motor M both in the direction shown with a broken line arrow 7 flow through the FET $Q_3$ and the diode $D_4$. When the generated current is increased, the differential output of the differential amplifier 4, i.e., the signal $I_d$ being equivalent to the detected value of the motor driving current, is increased to exceed the signal $I_1$ being equivalent to the target motor current (i.e., the non-inverted input has a larger absolute value than the inverted input). Then, the polarity of the differential output of the differential amplifier 1, i.e., the signal $V_1$ indicating the target motor voltage, becomes reverse of that of the signal $I_1$ being equivalent to the target motor current. When the polarity of the signal $V_1$ indicating the target motor voltage becomes reverse, the FET driving circuit 2 makes the motor driving voltage $V_N$ zero, thereby turning off all the FETs including the FETs $Q_2$ and $Q_3$. Accordingly, no current flows through the resistance R, and the differential output of the differential amplifier 4, i.e., the signal $I_d$ being equivalent to the detected value of the motor driving current, becomes zero. As a result, the polarity of the differential output of the differential amplifier 1, i.e., the signal $V_1$ being equivalent to the target motor voltage, regains its original polarity.

When the signal $V_1$ being equivalent to the target motor voltage regains the original polarity, the FET driving circuit 2 generates the motor driving voltage $V_N$ corresponding to the signal $V_1$ being equivalent to the target motor voltage, and performs the PWM control on the FET $Q_2$ and turns on the FET $Q_3$ again. When the FET $Q_2$ is PWM controlled and the FET $Q_3$ is turned on, a PWM controlled current flows through the FETs $Q_2$ and $Q_3$, and a generated current caused by the rotation of the motor M flows through the FET $Q_3$ and the diode $D_4$ again. The generated current is increased, thereby increasing the differential output of the differential amplifier 4, i.e., the signal $I_d$ being equivalent to the detected value of the motor driving current to exceed the signal $I_1$ being equivalent to the target motor current. That is to say, the inverted input has a larger absolute value than the non-inverted input. Then, the polarity of the differential output of the differential amplifier 1, i.e., the signal $V_1$ being equivalent to the target motor voltage, becomes reverse again. In this manner, such a process is repeated, resulting in disadvantageously causing the control hunting and making an abnormal noise in the motor M.

Next, a motor lock check circuit will be described. FIG. 3 is a block diagram showing the configuration in the major part of the motor lock check circuit in the conventional electric power steering apparatus. The motor lock check is an operation to check whether or not the motor in the electric power steering apparatus normally works (i.e., whether or not the motor is locked) when an ignition switch is turned on. FETs $Q_1$, $Q_2$, $Q_3$ and $Q_4$ form a bridge circuit, and a motor M and a resistance R for detecting a motor driving current are connected in series so as to bridge the contact between the FETs $Q_1$ and $Q_3$ connected in series and the contact between the FETs $Q_2$ and $Q_4$ connected in series. The FETs $Q_1$, $Q_2$, $Q_3$ and $Q_4$ are connected with free wheeling diodes $D_1$, $D_2$, $D_3$ and $D_4$ in parallel, respectively. The bridge circuit, a fail safe relay 24 and a power supply B are connected in series.

After an ignition switch (not shown) is turned on, the fail safe relay 24 is turned on by a controller (not shown). In an off condition of an electromagnetic clutch (not shown) for transferring the driving force of the motor M to a steering assisting mechanism, a signal processor 23 turns on, for example, the FETs $Q_1$ and $Q_4$ via an FET driving circuit 20, and drives the motor M for a predetermined period of time by a driving current flowing in the direction shown with a solid line arrow 25. Then, the signal processor 23 turns off all the FETs including the FETs $Q_1$ and $Q_4$, and allows the motor to rotate by the inertial force. A motor terminal voltage detecting circuit 22 detects a generated voltage caused by this rotation of the motor M. Then, the signal processor 23 outputs a signal for braking the motor M to the FET driving circuit 20 before the electromagnetic clutch is turned on. The FET driving circuit 20 turns on the FET $Q_2$ in response to the signal for braking the motor M, and the motor M is stopped by a regenerated current that is generated by the generated voltage caused by the inertial rotation of the motor M and flows through the free wheeling diode $D_1$ and the FET $Q_2$ in the direction shown with a broken line arrow 26.

FIG. 4 is a timing chart showing the variation in the motor current during the motor lock check. In this timing chart, $T_1$ indicates a driving time of the motor M, when a driving current flows as shown with the solid line arrow 25; $T_2$ indicates a time required for detecting a generated voltage caused by the inertial rotation of the motor M, when no current flows through the bridge circuit because all the FETs are off; and $T_3$ indicates a braking time of the motor M, when a regenerated current flows in the direction shown with the broken line arrow 26.

In this manner, in a conventional motor lock check circuit, a generated voltage caused by the rotation of the motor M is detected by the motor terminal voltage detecting circuit 22, which detection requires the time $T_2$.

SUMMARY OF THE INVENTION

The present invention is devised to solve the above-mentioned problems, and the objective of the invention is providing an electric power steering apparatus in which a steering wheel can be smoothly returned to its neutral position and no control hunting is caused.

The electric power steering apparatus of this invention comprises a bridge circuit including a motor and two pairs of switching elements provided for driving the motor in the clockwise direction and in the counterclockwise direction, respectively, decision means for deciding whether or not said steering wheel is being returned to its neutral position, and means for performing PWM control on one switching element of one pair of the two pairs of switching elements in accordance with the torque supplied to the steering wheel and turning off the other switching element of that particular pair of the switching elements when the decision means decides that the steering wheel is being returned to its neutral position.

Accordingly, while the steering wheel is being returned to its neutral position, a generated current caused by the rotation of the motor flows in accordance with a duty ratio of the PWM control. Therefore, the motor driving current never becomes zero, thereby preventing a control hunting and allowing the steering wheel a smooth braking force.

In the electric power steering apparatus of the invention, said decision means includes a resistance connected with said motor in series at a bridging portion in said bridge circuit, a differential amplifier for obtaining a difference between a motor driving current detected at said resistance and a target value of the motor driving current in accordance with the torque supplied to said steering wheel, means for deciding whether or not the polarities of the target value of said motor driving current and a differential output of said differential amplifier are different, and means for detecting the change of the polarity of said differential output. When the means for deciding whether said polarities are different decides that the polarities are different and the means for detecting the change decides that said polarity is changed, the decision means decides that said steering wheel is being returned to its neutral position.

Accordingly, when said decision means decides that the steering wheel is being returned, one of the switching elements that has been PWM controlled is turned off, and the other of the switching elements is PWM controlled instead. As a result, a generated current caused by the rotation of the motor is allowed to flow in accordance with a duty ratio of the PWM control. Therefore, the motor driving current never becomes zero, thereby preventing a control hunting and allowing the steering wheel a smooth braking force.

The above and further objects and features of the invention will more fully be apparent from the following detailed description with accompanying drawings.

DESCRIPTION OF THE PREFERRED EMBODIMENTS

The present invention will now be described referring to the accompanying drawings illustrating the embodiments thereof.

Figure 5:
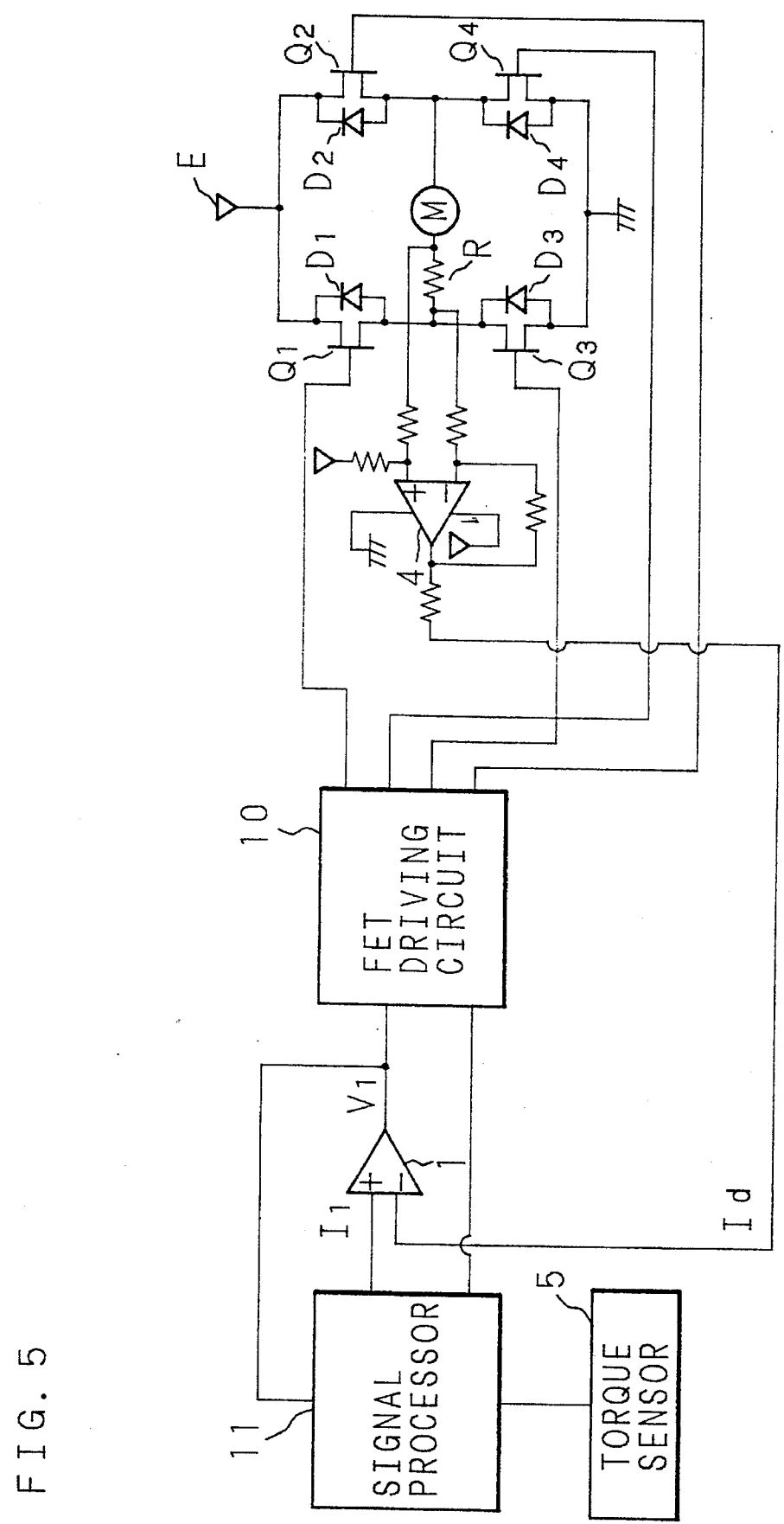
FIG. 5 is a circuit diagram of the configuration in the major part of a motor control circuit in an electric power steering apparatus according to an embodiment of the invention.
Figure 6:
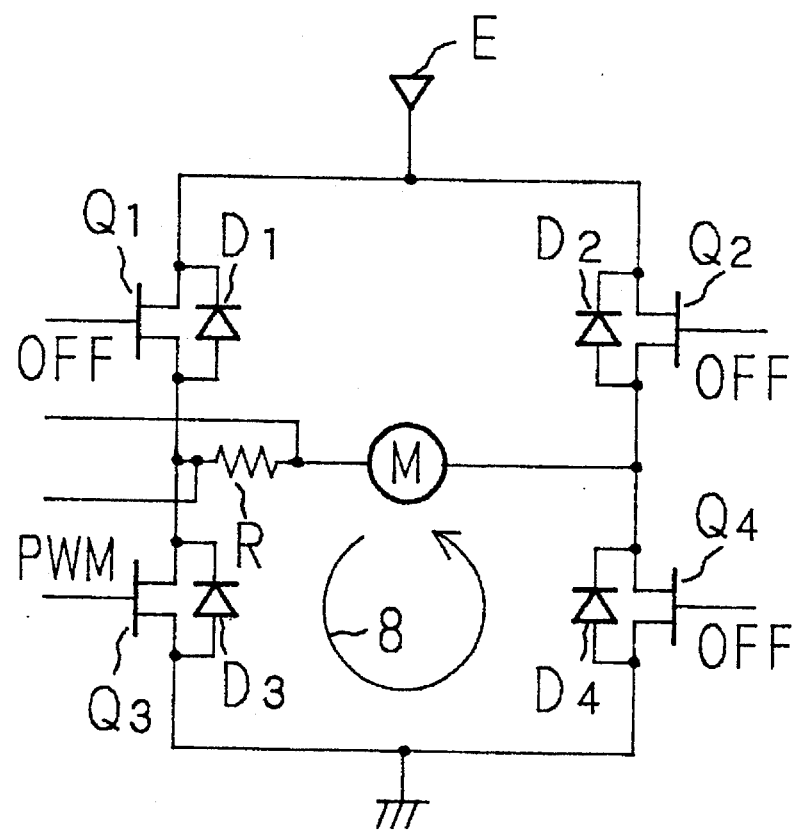
FIG. 6 illustrates the operation of the motor control circuit of FIG. 5.

FIG. 5 is a circuit diagram of the configuration in the major part of a motor control circuit in an electric power steering apparatus according to one embodiment of the invention, and FIG. 6 illustrates the operation of a bridge circuit in the motor control circuit. FETs $Q_1$, $Q_2$, $Q_3$ and $Q_4$ form the bridge circuit between a power supply E and a ground terminal. A motor M and a resistance R for detecting a motor driving current are connected in series so as to bridge the contact between the FETs $Q_1$ and $Q_3$ connected in series and the contact between the FETs $Q_2$ and $Q_4$ connected in series. The FETs $Q_1$, $Q_2$, $Q_3$ and $Q_4$ are connected with free wheeling diodes $D_1$, $D_2$, $D_3$ and $D_4$ in parallel, respectively. Voltages at both ends of the resistance R for detecting the motor driving current are inputted to the non-inverted input terminal and the inverted input terminal of a differential amplifier 4, which sends the differential output to the inverted input terminal of a differential amplifier 1 described below as a signal $I_d$ being equivalent to a detected value of the motor driving current.

The value of steering torque supplied to a steering wheel (not shown) and detected by a torque sensor 5 is inputted to a signal processor 11, which outputs, in accordance with the detected torque, a signal $I_1$ being equivalent to a target motor current (i.e., a target value of the motor current) to the non-inverted input terminal of the differential amplifier 1. The inverted input terminal of the differential amplifier 1 receives the signal $I_d$ being equivalent to the detected value of the motor driving current as described above, and hence, the differential amplifier 1 outputs a difference between these inputted values to an FET driving circuit 10 as a signal $V_1$ being equivalent to a target motor voltage required for supplying the target motor current to the motor M.

In the FET driving circuit 10, the signal $V_1$ being equivalent to the target motor voltage is used as a current motor driving voltage $V_N$ in the current sampling cycle. By using a duty ratio corresponding to the magnitude of the absolute value of the motor driving voltage $V_N$, and also in accordance with the polarity of the motor driving voltage $V_N$, the FET driving circuit 10 controls the driving of the motor M in the clockwise or the counterclockwise direction. This control is performed by, for example, turning on the FET $Q_3$ and simultaneously PWM controlling the FET $Q_2$, or by turning on the FET $Q_4$ and simultaneously PWM controlling the FET $Q_1$.

Figure 7:
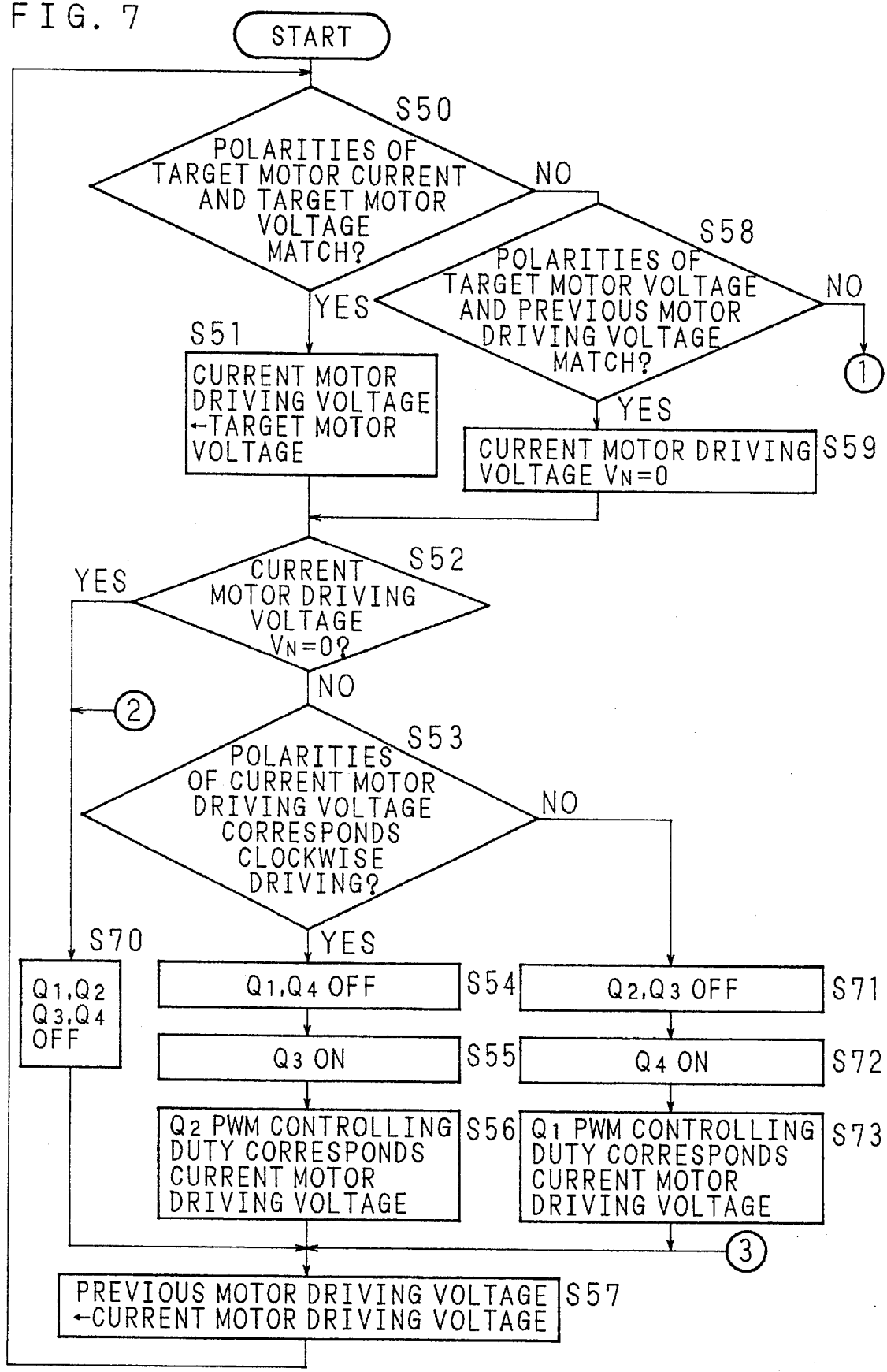
FIG. 7 is a flow chart for the operation of the motor control circuit of FIG. 5.
Figure 8:
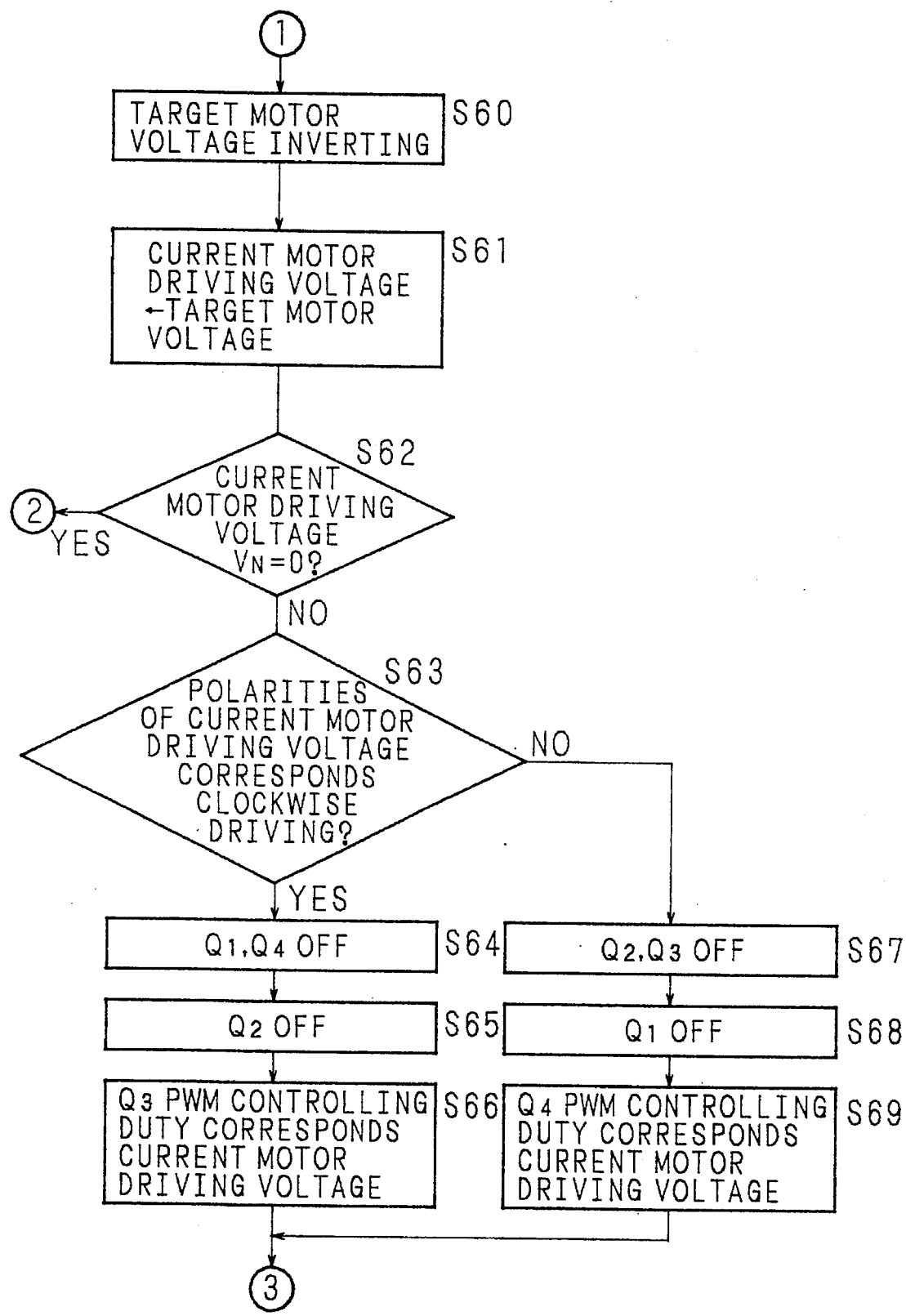
FIG. 8 is another flow chart for the operation of the motor control circuit of FIG. 5.

The operation of the electric power steering apparatus having the aforementioned motor control circuit will be described referring to flow charts shown in FIGS. 7 and 8.

The value of the steering torque detected by the torque sensor 5 is inputted to the signal processor 11, which outputs the signal $I_1$ being equivalent to the target motor current in accordance with the detected torque to the non-inverted input terminal of the differential amplifier 1. The inverted input terminal of the differential amplifier 1 receives, as described above, the signal $I_d$ being equivalent to the detected value of the motor driving current, and therefore, the differential amplifier 1 outputs a difference between these inputted values to the FET driving circuit 10 and the signal processor 11 as the signal $V_1$ being equivalent to the target motor voltage.

Figure 1:
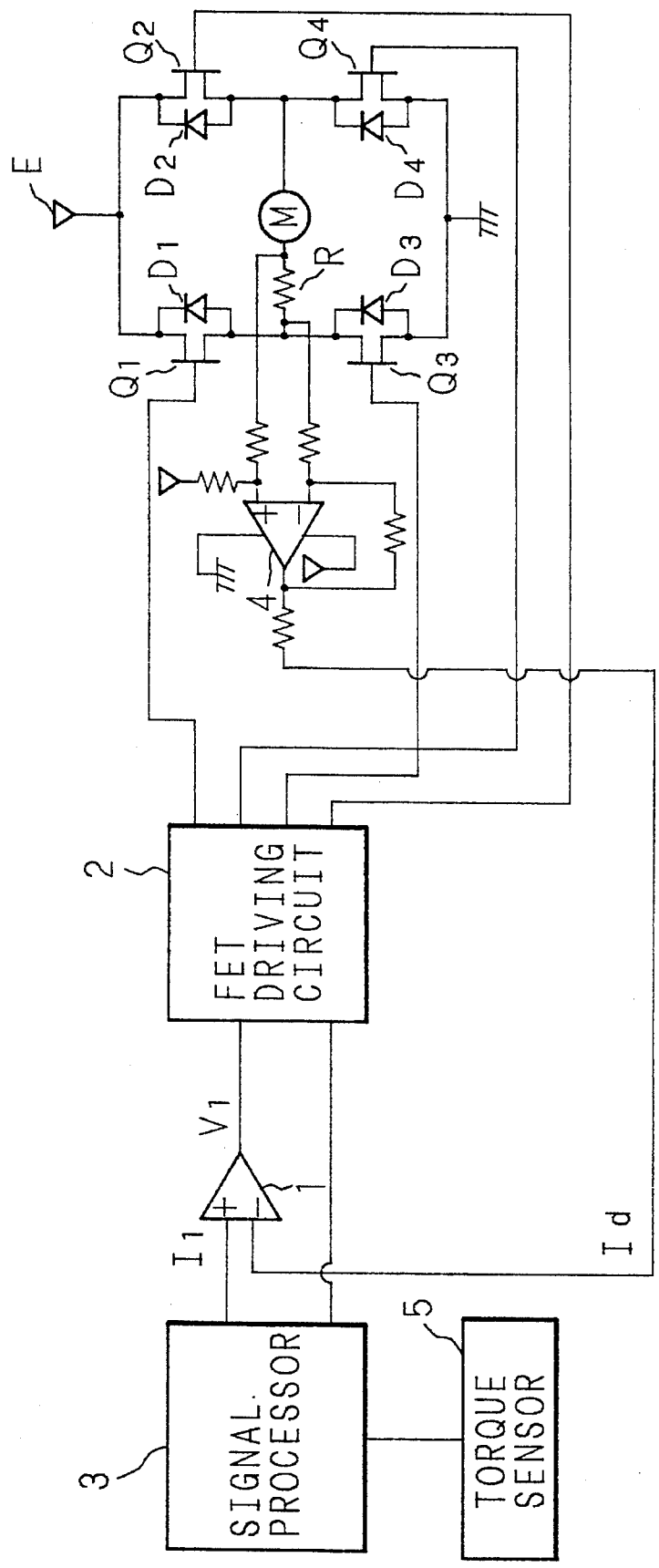
FIG. 1 is a circuit diagram showing the configuration of a motor control circuit in a conventional electric power steering apparatus.
Figure 2:
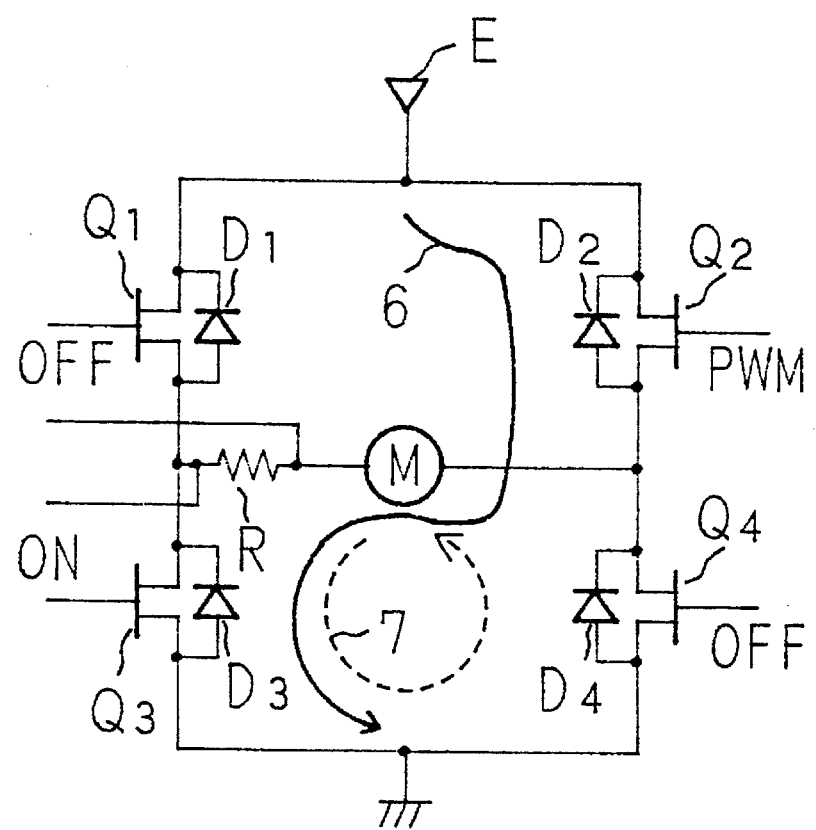
FIG. 2 illustrates the operation of a bridge circuit in the usual motor control circuit.
Figure 3:
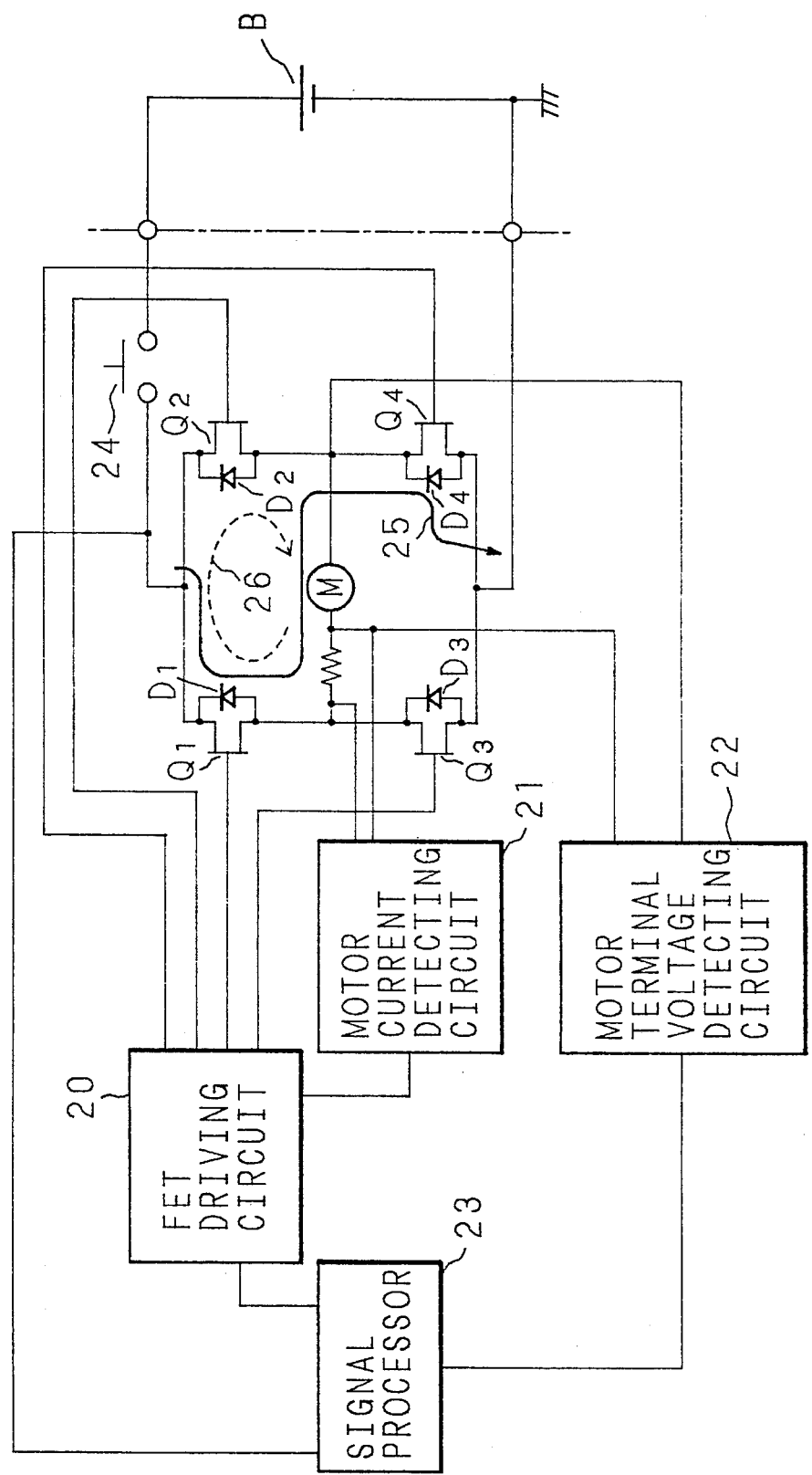
FIG. 3 is a block diagram showing the configuration in the major part of a motor lock check circuit in the conventional electric power steering apparatus.

The signal processor 11 compares the polarity of the signal $I_1$ being equivalent to the target motor current with that of the target motor voltage (step S50). When their polarities are matched, that is, when the driving force of the motor is insufficient, the FET driving circuit 10 uses the signal $V_1$ being equivalent to the target motor voltage as the current motor driving voltage $V_N$ (step S51). When the current motor driving voltage $V_N$ is not 0 (step S52), the FET driving circuit 10 checks the polarity of the motor driving voltage $V_N$ (step S53). When the polarity corresponds to the clockwise driving of the motor M, for example, the FETs $Q_1$ and $Q_4$ are turned off (step S54), and the FET $Q_3$ is turned on (step S55). Simultaneously, the FET $Q_2$ is PWM controlled at a duty ratio in accordance with the current motor driving voltage $V_N$ (step S56). In this case, while the PWM controlled FET $Q_2$ is on, a motor driving current in the direction as shown with a solid line arrow 6 in FIG. 2 flows through the FETs $Q_2$ and $Q_3$ in accordance with the duty ratio of the PWM control. While the PWM controlled FET $Q_2$ is off, a generated current caused by the rotation of the motor M and a regenerated current caused by the inductance of the motor M both in the direction as shown with a broken line arrow 7 in FIG. 2 flows through the FET $Q_3$ and the diode $D_4$.

When the polarity of the current motor driving voltage $V_N$ corresponds to the counterclockwise driving of the motor M, for example, the FETs $Q_2$ and $Q_3$ are turned off (step S71), and the FET $Q_4$ is turned on (step S72). Simultaneously, the FET $Q_1$ is PWM controlled at a duty ratio in accordance with the current motor driving voltage $V_N$ (step S73). In this case, a motor driving current flows through the FETs $Q_1$ and $Q_4$ in accordance with the duty ratio of the PWM control.

When the current motor driving voltage $V_N$ is 0 (step S52), that is, when the steering torque is 0, and hence, the signal $I_1$ being equivalent to the target current is also 0, the FET driving circuit 10 turns off the FETs $Q_1$, $Q_2$, $Q_3$ and $Q_4$ (step S70). In this case, no current flows through the motor M.

The signal processor 11 compares the polarity of the signal $I_1$ being equivalent to the target motor current and that of the signal $V_1$ being equivalent to the target motor voltage (step S80). When their polarities are not matched, the signal processor 11 compares the polarity of the signal $V_1$ being equivalent to the target motor voltage and that of a previous motor driving voltage $V_0$ in the previous sampling cycle of the signal processor 11 (step S58).

When the polarities of the signal $V_1$ being equivalent to the target motor voltage and the motor driving voltage $V_0$ in the previous sampling cycle are not matched, the FET driving circuit 10 inverts the signal $V_1$ being equivalent to the target motor voltage (step S60), and the obtained inverted signal $-V_1$ is used as the current driving voltage $V_N$ (step S61).

When the current motor driving voltage $V_N$ is not 0 (step S62), that is, when the steering wheel is returning to its neutral position, the FET driving circuit 10 checks the polarity of the motor driving voltage $V_N$ (step S63). When the polarity corresponds to the clockwise driving of the motor M, for example, the FETs $Q_1$ and $Q_4$ are turned off (step S64), and the FET $Q_2$ is also turned off (step S65). Simultaneously, the FET $Q_3$ is PWM controlled at a duty ratio in accordance with the current motor driving voltage $V_N$ (step S66). In this case, a generated current of the motor M flows in the direction as shown with a solid line arrow 8 in FIG. 6 through the FET $Q_3$ and the diode $D_4$. The returning steering wheel is braked by merely a force generated from the PWM controlled generated current of the motor M. As a result, the steering wheel can be returned smoothly.

When the polarity of the current motor driving voltage $V_N$ corresponds to the counterclockwise driving of the motor M, for example, the FETs $Q_2$ and $Q_3$ are turned off (step S67), and the FET $Q_1$ is also turned off (step S68). Simultaneously, the FET $Q_4$ is PWM controlled at a duty ratio in accordance with the current motor driving voltage $V_N$ (step S69). In this case, a generated current of the motor M flows in the reverse direction of that shown with the solid line arrow 8 in FIG. 6 through the FET $Q_4$ and the diode $D_3$, and the returning steering wheel is braked by merely a force generated by the PWM controlled generated current of the motor M. As a result, the steering wheel can be returned smoothly.

When the current motor driving voltage $V_N$ is 0 (step S62), that is, for example, the driving force of the motor M is neither too much nor too little, the FET driving circuit 10 turns off the FETs $Q_1$, $Q_2$, $Q_3$ and $Q_4$ (step S70). In this case, no current flows through the motor M.

When the polarities of the signal $V_1$ indicating the target motor voltage and the previous motor driving voltage $V_0$ in the previous sampling cycle are matched (step S58), that is, for example, when the steering wheel is being returned and the driving force of the motor M is neither too much nor too little, the FET driving circuit 10 makes the current driving voltage $V_N$ zero, and turns off the FETs $Q_1$, $Q_2$, $Q_3$ and $Q_4$ (step S70). In this case, no current flows through the motor M.

In the subsequent sampling cycle, the signal processor 11 replaces the current motor driving voltage $V_N$ with the previous motor driving voltage $V_0$ (step S57), and then, performs the subsequent sampling for the next steering torque value, and compares the polarity of the signal $I_1$ being equivalent to the subsequent target motor current and that of the signal $V_1$ being equivalent to the subsequent target motor voltage (step S50). In this manner, such a procedure is repeated until the ignition switch (not shown) is turned off.

As described above, in returning the steering wheel to its neutral position, the only factor to generate a braking force in the reverse direction of the direction in which the steering wheel is returned is a generated current caused by the driving of the motor M flowing under the PWM control. Accordingly, the steering wheel can be returned smoothly. Further, neither a control hunting nor an abnormal noise in the motor M is caused.

Figure 9:
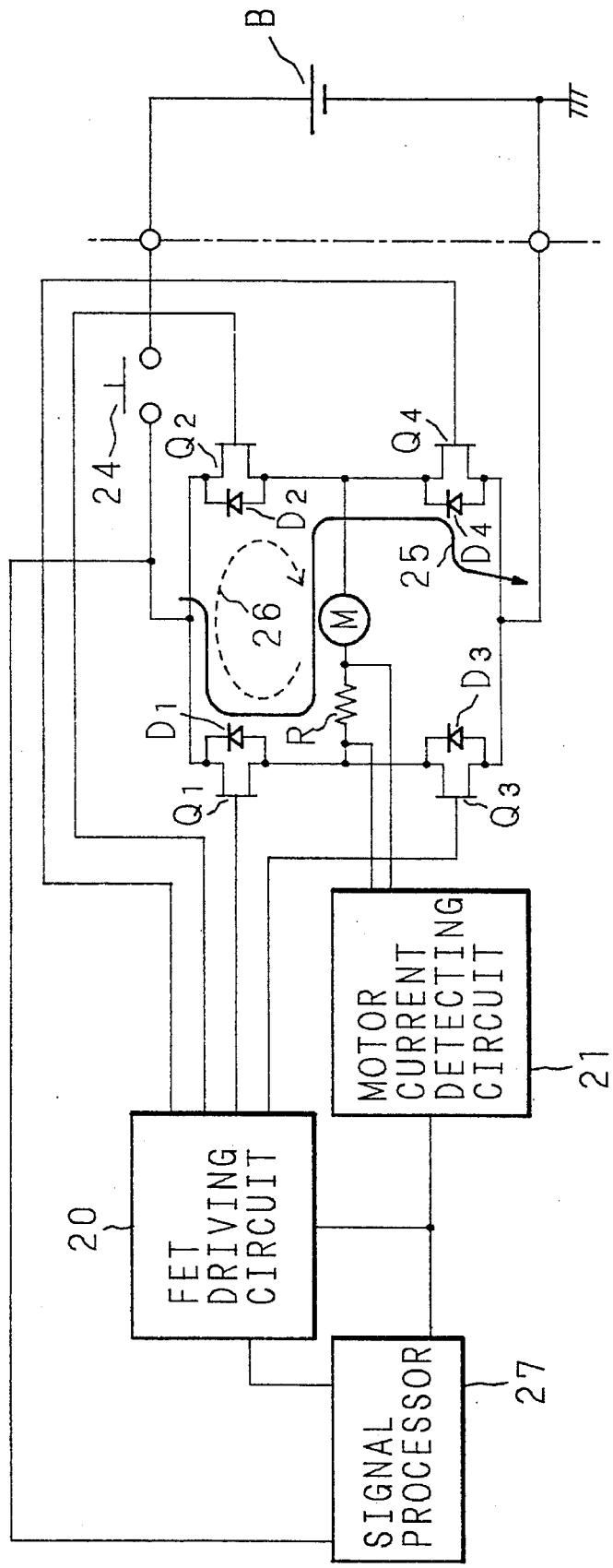
FIG. 9 is a block diagram of the configuration in the major part of a motor lock check circuit in the present electric power steering apparatus.

Now, a motor lock check circuit in the electric power steering apparatus will be described. FIG. 9 is a block diagram showing the configuration in the major part of the motor lock check circuit. FETs $Q_1$, $Q_2$, $Q_3$ and $Q_4$ form a bridge circuit, and a motor M and a resistance R for detecting a motor driving current are connected in series so as to bridge the contact between the FETs $Q_1$ and $Q_3$ connected in series and the contact between the FETs $Q_2$ and $Q_4$ connected in series. The FETs $Q_1$, $Q_2$, $Q_3$ and $Q_4$ are connected with free wheeling diodes $D_1$, $D_2$, $D_3$ and $D_4$ in parallel, respectively. Further, the bridge circuit and a fail safe relay 24 and a power supply B are connected in series.

After an ignition switch (not shown) is turned on, the fail safe relay 24 is turned on. In an off condition of an electromagnetic clutch (not shown) for transferring the driving force of the motor M to a steering assisting mechanism, an FET driving circuit 20 turns on, for example, the FETs $Q_1$ and $Q_4$ to drive the motor M for a predetermined period of time. Then, the FET driving circuit 20 turns off the FETs $Q_1$ and $Q_4$, and simultaneously turns on the FET $Q_2$. At this point, a generated voltage is caused by the inertial rotation of the motor M, and a regenerated current caused by the generated voltage flows through the free wheeling diode $D_1$ and the FET $Q_2$. A motor current detecting circuit 21, which is conventionally provided for controlling a motor current, detects the regenerated current caused by the generated voltage from the voltages at both the ends of the resistance R. The motor M is stopped by being braked by the regenerated current caused by the generated voltage.

Figure 10:
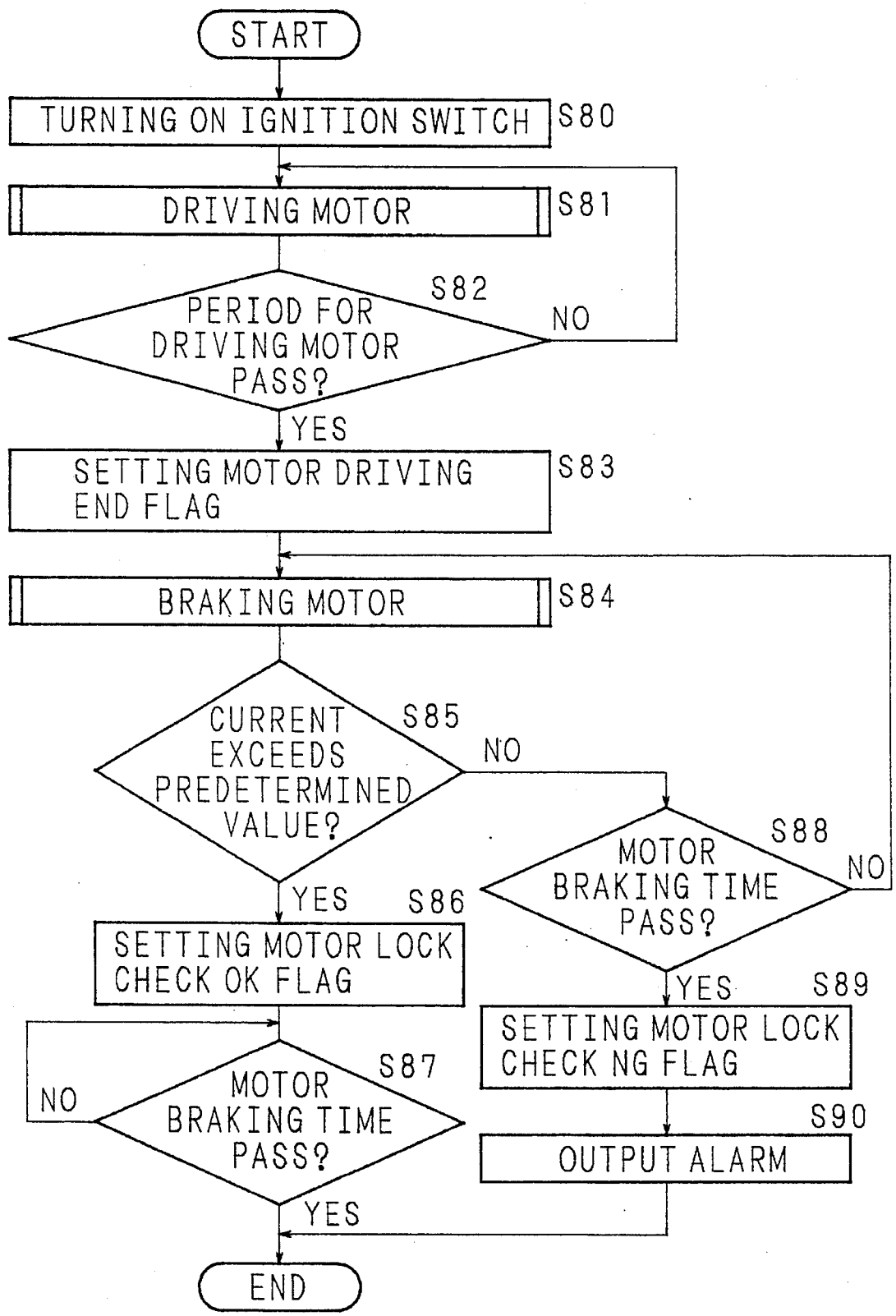
FIG. 10 is a timing chart for the operation of the motor lock check circuit of FIG. 9.

The operation of the motor lock check circuit in the electric power steering apparatus having the aforementioned configuration will be described referring to a flow chart shown in FIG. 10.

After the ignition switch is turned on, the fail safe relay 24 is turned on (step S80). Then, in an off condition of the electromagnetic clutch (not shown) for transferring the driving force of the motor M to the steering assisting mechanism, a signal processor 27 turns on, for example, the FETs $Q_1$ and $Q_4$ via the FET driving circuit 20, thereby driving the motor M by using a driving current flowing in the direction as shown with a solid line arrow 25 (step S81).

When a predetermined period of time has passed (step S82), the signal processor 27 sets a motor driving end flag (step S83), turns off the FETs $Q_1$ and $Q_4$, and simultaneously turns on the FET $Q_2$. At this point, a generated voltage is caused by the inertial rotation of the motor M, and a regenerated current caused by the generated voltage flows in the motor M through the free wheeling diode $D_1$ and the FET $Q_2$. The motor M is braked by this regenerated current (step S84).

The motor current detecting circuit 21 detects the regenerated current caused by the generated voltage of the motor M from the voltages at both the ends of the resistance R. When the current exceeds a predetermined value (step S85), the signal processor 27 sets a motor lock check OK flag (step S86). After a predetermined motor braking time has passed (step S87), the motor lock check is terminated before the clutch is turned on.

When the current detected by the motor current detecting circuit 21 from the voltages at both ends of the resistance R does not exceed the predetermined value (step S85), after the predetermined motor braking time has passed (step S88), the signal processor 27 sets a motor lock check NG flag (step S89). Then, the signal processor 27 outputs an alarm signal indicating the failure of the power steering apparatus to an alarm device (not shown) including an indicator light and the like (step S90).

Figure 11:
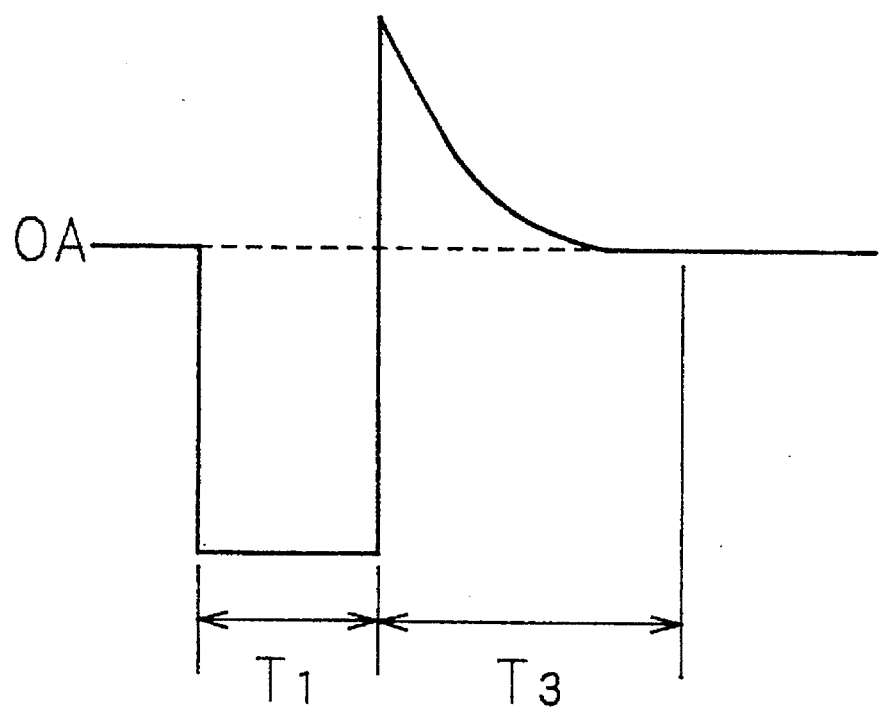
FIG. 11 is a flow chart for the operation of the motor lock check circuit of FIG. 9.

FIG. 11 is a timing chart showing the variation in the motor current during such a motor lock check. In this timing chart, $T_1$ indicates a driving time of the motor M, when a driving current flows in the direction as shown with the solid line arrow 25; and $T_3$ indicates a braking time of the motor M, when a regenerated current flows in the direction as shown with the broken line arrow 26.

Figure 4:
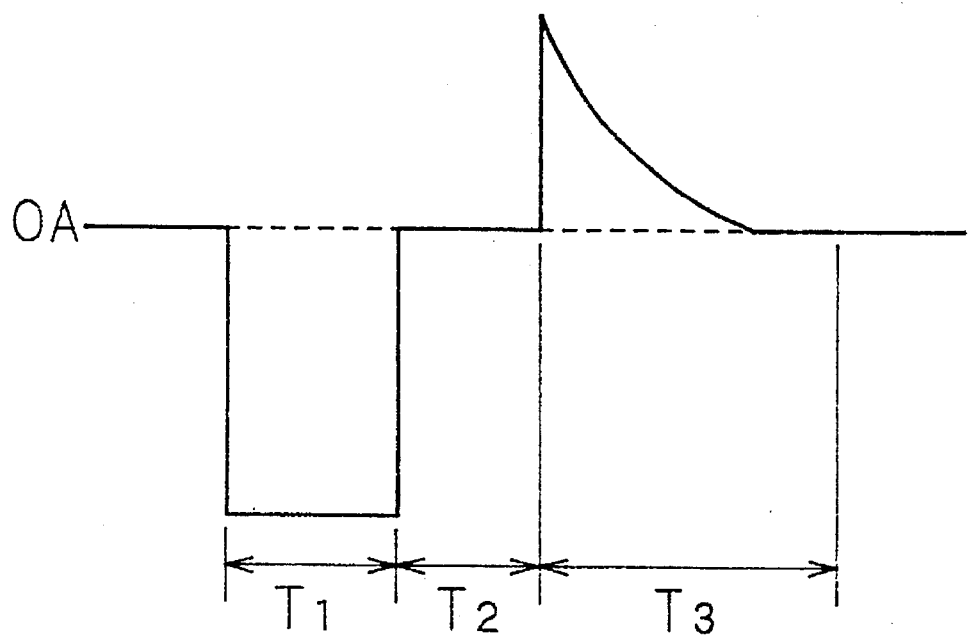
FIG. 4 is a timing chart for the operation of the motor lock check circuit of FIG. 3.

As described above, according to the present electric power steering apparatus, the motor current detecting circuit 21, which is conventionally provided for controlling a motor current, is used to perform the motor lock check. Therefore, a conventionally used motor terminal voltage detecting circuit 22 is not required, resulting in decreasing the producing cost. Further, there is no need for the time $T_2$ for detecting a generated voltage caused by the inertial rotation of the motor M, which is conventionally required as shown in FIG. 4. Accordingly, the motor lock check requires a shorter period of time.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. An electric power steering apparatus for assisting a steering force by driving a motor in response to torque supplied to a steering wheel that can be turned in either direction relative to a neutral position, comprising:

a bridge circuit including said motor, a second and a third switching element for driving said motor in a clockwise direction, and a first and a fourth switching element for driving said motor in a counter-clockwise direction;

decision means for deciding whether said steering wheel is being returned to its neutral position; and means for performing PWM control on said third switching element in accordance with the torque supplied to the steering wheel and turning off said second switching element when said decision means decides that the steering wheel is being returned to its neutral position as said motor is driven in the clockwise direction and for performing PWM control on said fourth switching element in accordance with the torque supplied to the steering wheel and turning off said first switching element when said decision means decides that the steering wheel is being returned to its neutral position as said motor is driven in the counter-clockwise direction.

2. An electric power steering apparatus according to claim 1, wherein said decision means includes:

a resistance connected with said motor in series at a bridging portion in said bridge circuit;

a differential amplifier for obtaining a difference between a motor driving current detected by said resistance and a target value of the motor driving current in accordance with the torque supplied to the steering wheel;

means for deciding whether polarities of said target value of the motor driving current and a differential output of said differential amplifier are different; and means for detecting change of the polarity of said differential output, and said decision means decides that the steering wheel is being returned to its neutral position when said means for deciding whether the polarities are different decides that the polarities are different and said means for detecting the change of the polarity decides that the polarity is changed.

\* \* \* \* \*